(12) United States Patent
Katada

(10) Patent No.: US 6,556,129 B1
(45) Date of Patent: Apr. 29, 2003

(54) SELECTIVE CALLING RECEIVER AND METHOD OF DISPLAYING RECEIVED MESSAGE DATA

(75) Inventor: Nobuyuki Katada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,967

(22) Filed: May 25, 1999

(30) Foreign Application Priority Data

May 27, 1998 (JP) ............................................ 10-145435

(51) Int. Cl.$^7$ ............................ G08B 5/22; H04Q 1/30; H04Q 7/00; H04B 1/18
(52) U.S. Cl. .................... 340/7.51; 340/7.52; 340/7.55; 455/158.4
(58) Field of Search ................................ 340/575, 7.32, 340/7.52, 7.51, 7.62, 267, 825.36, 825.37, 7.1, 7.2, 7.22, 7.43, 7.44, 7.61, 825.4; 455/38.2, 158.4, 38.4, 158.5

(56) References Cited

U.S. PATENT DOCUMENTS

| | | | | |
|---|---|---|---|---|
| 5,087,905 A | * | 2/1992 | Kuramatsu et al. | 340/311.1 |
| 5,203,014 A | * | 4/1993 | Wagai et al. | 455/38.2 |
| 5,784,000 A | * | 7/1998 | Sato | 340/825.44 |
| 5,784,001 A | * | 7/1998 | DeLucca et al. | 340/825.44 |
| 5,872,518 A | * | 2/1999 | Kushita | 340/825.03 |
| 6,032,021 A | * | 2/2000 | Sato | 455/31.1 |

FOREIGN PATENT DOCUMENTS

| | | |
|---|---|---|
| JP | 62-181535 | 8/1987 |
| JP | 64-2427 | 1/1989 |
| JP | 7-321938 | 12/1995 |
| JP | 10-66124 | 3/1998 |

OTHER PUBLICATIONS

Japanese Office action with translation of Japanese Examiner's comments.

* cited by examiner

Primary Examiner—Michael Horabik
Assistant Examiner—Nam V Nguyen
(74) Attorney, Agent, or Firm—Whitham, Curtis & Christofferson, P.C.

(57) ABSTRACT

There is provided a selective calling receiver including a display, a radio signal receiver, a detector detecting and waveform-shaping a radio signal, a first memory storing therein at least one calling number of the selective calling receiver, a second memory storing received message data therein, a third memory storing therein a map defining a relation between bit rows and letter data, a decoder decoding a signal transmitted from the means, and discriminating whether a calling number in a received signal is coincident with the calling number of the selective calling receiver, and a discriminator discriminating whether the received message data is text data or graphics data, based on the calling number of the selective calling receive. The discriminator stores the message data in the third memory as a letter code including at least one unit comprised of the predetermined number of bits, reads out letter data corresponding to the message data, out of the second memory, and displays the thus read-out letter data in the display, when the message data is text data. The discriminator stores the message data in the third memory as dot data in a unit indicative of the number of dots per a row, and displays the message data in the unit in the display, when the message data is graphics data. The selective calling receiver makes it possible to display any received message data, regardless that the received message data is text data or graphics data, without including ROM defining correspondence between letters and received data.

13 Claims, 5 Drawing Sheets

| BIT ROW | LETTER |
|---------|--------|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | U |
| 1100 | SPACE |
| 1101 | - |
| 1110 | ] |
| 1111 | [ |

FIG. 3

SELECTIVE CALLING RECEIVER AND METHOD OF DISPLAYING RECEIVED MESSAGE DATA

BACKGROUND OF THE INVENTION

1. Field of the Invention

The invention relates to a selective calling receiver displaying received message data in a display, and also to a method of displaying received message data.

2. Description of the Related Art

A conventional selective calling receiver displays message data in a display as follows, when message data to be displayed is received. First, the selective calling receiver compares a selective calling number indicated in a received signal to its own calling number stored in a memory. If they are coincident with each other, rows of message data included in the received signal are recognized as letter code, and then, the rows of message data are displayed in a display as letter data.

In the conventional selective calling receiver, a message signal is received as successive digital data. However, in a logical sense, a message data is grouped into a plurality of bit rows each including the predetermined number of bits. A bit row corresponds to a letter. The received message is displayed in a display in accordance with table look-up process. Specifically, the thus extracted bit rows are converted into letter data in accordance with a relation between letter codes and letters, stored in a read only memory (ROM), and then, the thus converted letter data is displayed in a display.

For instance, Japanese Unexamined Patent Publication No. 62-181535 has suggested a radio data display system including an input device through which message data is input, an encoder encoding an output signal transmitted from the input device, a radio transmitter which modulates carrier waves with output signals transmitted from the encoder, and transmits the thus modulated carrier waves, a radio paging receiver which demodulates the modulated carrier waves to thereby obtain message data, and displays the message data in a display, and a display on which the radio paging receiver is mounted and displays message data thereon.

Japanese Unexamined Patent Publication No. 64-2427 has suggested a selective calling radio-receiver characterized by means for displaying letters and/or figures in braille.

Japanese Unexamined Patent Publication No. 7-321938 has suggested a selective calling radio-receiver including a card interface through which the selective calling radio-receiver is connected to an external unit, a memory storing therein at least two calling numbers of the selective calling radio-receivers, and a controller which transmits both data indicating that which calling number is used at a received call and message data included in a selective calling signal to the external unit through the card interface, when a selective calling number included in a received selective calling signal is coincident with any one of the calling numbers stored in the memory.

Japanese Unexamined Patent Publication No. 10-66124 has suggested a selective calling radio-receiver including a display displaying message included in a received radio selective signal. The display is partitioned into a first display area and a second display area. In dependence on a volume of message to be displayed, the first display area is expanded into the second display area to thereby display message in the first display area.

However, the above-mentioned conventional selective calling receivers are accompanied with problems as follows.

The first problem is that it is impossible to display a letter which is not stored in ROM, because received message data consists of predetermined letter codes, and hence, only letters corresponding to received letter codes and stored in ROM can be displayed. For instance, if ROM stores therein only Japanese-language letters, it is impossible to display message including English and Chinese letters which are not stored in ROM.

The second problem is as follows. It is now assumed that message relating to data of stocks is received, and the received message indicates items such as a company's name and a price in a first row, and indicates various data associated with the items in second and later rows. If an icon indicating that message is received is automatically inserted at a head of a first row in the received message, a space located at an end in the first row is forced to eject to a head of the second row. As a result, letters are misaligned between the first and second rows, resulting in difficulty in reading the displayed message.

The third problem is as follows. If there occurred data receipt error even by only one bit while message is being received, letter codes received in a selective calling radio-receiver become quite different from letters codes having been transmitted from a transmitter such as a base station. Hence, when the selective calling radio-receiver converts the received letter codes into letters stored in ROM, the selective calling radio-receiver selects letters different from letters having been actually transmitted from a transmitter. As a result, the message displayed in a display is unclear in meaning.

SUMMARY OF THE INVENTION

In view of the above-mentioned problems in the conventional selective calling radio-receiver, it is an object of the present invention to provide a selective calling radio-receiver which is capable of displaying any kind of letters, and displaying data except letters, such as graphics, based on received message data.

It is also an object of the present invention to provide a method of displaying message data which method is capable of doing the same.

In one aspect of the present invention, there is provided a selective calling receiver including (a) a display, (b) a discriminator receiving message data and selective calling number data, and discriminating whether the message data is first data consisting of letters or second data consisting of images, based on the selective calling number data, and (c) a controller displaying the message data in the display, as letter data or image data in dependence on a discrimination result provided by the discriminator.

For instance, the message data is graphics data transmitted from a base station as text data.

There is further provided a selective calling receiver including (a) a display, (b) a memory storing at least one calling number of the selective calling receiver, (c) a comparator comparing a selective calling number contained in a received signal to the calling number of the selective calling receiver, and (d) a controller which discriminates whether received message data is text data or graphics data, based on the calling number of the selective calling receiver coincident with the selective calling number, and which displays the message data as dot data row in the display when the message data is graphics data, or displays the message data as letter data in the display when the message data is text data.

It is preferable that the memory stores a plurality of calling numbers of the selective calling receiver, each of the calling numbers being assigned to text data or graphics data.

There is still further provided a selective calling receiver including (a) a display, (b) a radio signal receiver, (c) means for detecting and waveform-shaping a radio signal having been received through the radio signal receiver, (d) a first memory storing therein at least one calling number of the selective calling receiver, (e) a second memory storing received message data therein, (f) a third memory storing therein a map defining a relation between bit rows and letter data, (g) a decoder decoding a signal transmitted from the means, and discriminating whether a calling number in a received signal is coincident with the calling number of the selective calling receiver, and (h) a discriminator discriminating whether the received message data is text data or graphics data, based on the calling number of the selective calling receiver, the discriminator storing the message data in the third memory as a letter code including at least one unit comprised of the predetermined number of bits, reading out letter data corresponding to the message data, out of the second memory, and displaying the thus read-out letter data in the display, when the message data is text data, the discriminator storing the message data in the third memory as dot data in a unit indicative of the number of dots per a row, and displaying the message data in the unit in the display, when the message data is graphics data.

It is preferable that the message data includes first data indicative of the number of dots per a row in the display, and that when the message data is graphics data, the discriminator compares the number of dots indicated in the first data to the maximum number of dots per a row in the display, and displays the message data in the unit in the display, if the number of dots is equal to the maximum number of dots, inserts space bits into surplus dots per a row when the message data is displayed in the display, if the number of dots is smaller than the maximum number of dots, or abandons data about bits exceeding the maximum number of dots, and then, display the message data in the display, if the number of dots is greater than the maximum number of dots.

It is preferable that the first memory stores a plurality of calling numbers of the selective calling receiver, each of the calling numbers being assigned to text data or graphics data.

In another aspect of the present invention, there is provided a method of displaying a received message data, including the steps of (a) discriminating whether a calling number included in a received signal is a predetermined calling number, (b) discriminating whether the calling number is a number for graphics message or a number for text message, (c) storing first data and message data following the first data in a memory, if the calling number is a number for graphics message, the first data indicating the number of dots per a row, (d) discriminating whether the number of dots indicated in the first data is equal to the maximum number of dots per a row, and (e) displaying a bit row in the message data within a range of the maximum number of dots, if the number of dots per a row, indicated in the first data is equal to the maximum number of dots per a row.

The method may further include the step of (f) discriminating whether the first data has been received without an error, and wherein the step (d) is carried out, if the first data has been received without an error.

The method may further include the step of (g) displaying received message data in a display, if the first data has been received with an error.

The method may further include the step of (h) discriminating whether the number of dots per a row is smaller than the maximum number of dots per a row, if the number of dots per a row is not equal to the maximum number of dots per a row, and inserting spaces into dots having no data therein, if the number of dots per a row is smaller than the maximum number of dots per a row.

The method may further include the step of (i), if the number of dots per a row is greater than the maximum number of dots per a row, abandoning message data included in surplus dots exceeding the maximum number of dots.

The advantages obtained by the aforementioned present invention will be described hereinbelow.

The first advantage is that the selective calling receiver makes it possible to display any received message data, regardless that the received message data is text data or graphics data, without including ROM defining correspondence between letters, graphics and characters, and received data.

This is because that the selective calling receiver is designed to select to deal with received message data as letter data or graphics data, based on its own calling number.

The second advantage is that the selective calling receiver can be fabricated in lighter weight and at reduced cost, and can deal with worldwide languages.

This is because the selective calling receiver makes it no longer necessary to prepare ROM storing correspondence between letter codes and letters for languages other than standard language.

The third advantage is that the selective calling receiver can prevent misalignment in a plurality of rows in message. It is now assumed that message relating to data of stocks is received, and the received message indicates items such as a company's name and a price of a stock in a first row, and indicates various data associated with the items in second and later rows. In accordance with the selective calling receiver, even if a message number is added into the first row, misalignment in rows would not occur, which ensures readiness with which an operator reads message data displayed in a display.

The reason for the third advantage is as follows. In the selective calling receiver, one bit in received data corresponds to one dot in a display. Since received data is directly instructed as to where it is displayed in a display, it is no longer necessary to insert spaces before and after a letter. As a result, even if a message number is added into the first row, a letter would not be changed as to where it is displayed.

The fourth advantage is that even if data error occurred while message data is being received, message data is less inappropriately converted into associated letters, ensuring higher reliability to users.

The reason is as follows. In the selective calling receiver, one bit data corresponds to one dot in a display in a graphics data mode. Since a letter is displayed in a couple of to about fifteen bits, even if there occurred error in one of bits, there is quite small possibility that the letter cannot be read. In addition, image data is displayed in tens of bits or greater, there is no possibility that the displayed image cannot be recognized.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 illustrates a map defining correspondence between letters and letter codes, wherein a letter is constituted of four bits.

DESCRIPTION OF THE PREFERRED EMBODIMENTS

Figure 1:
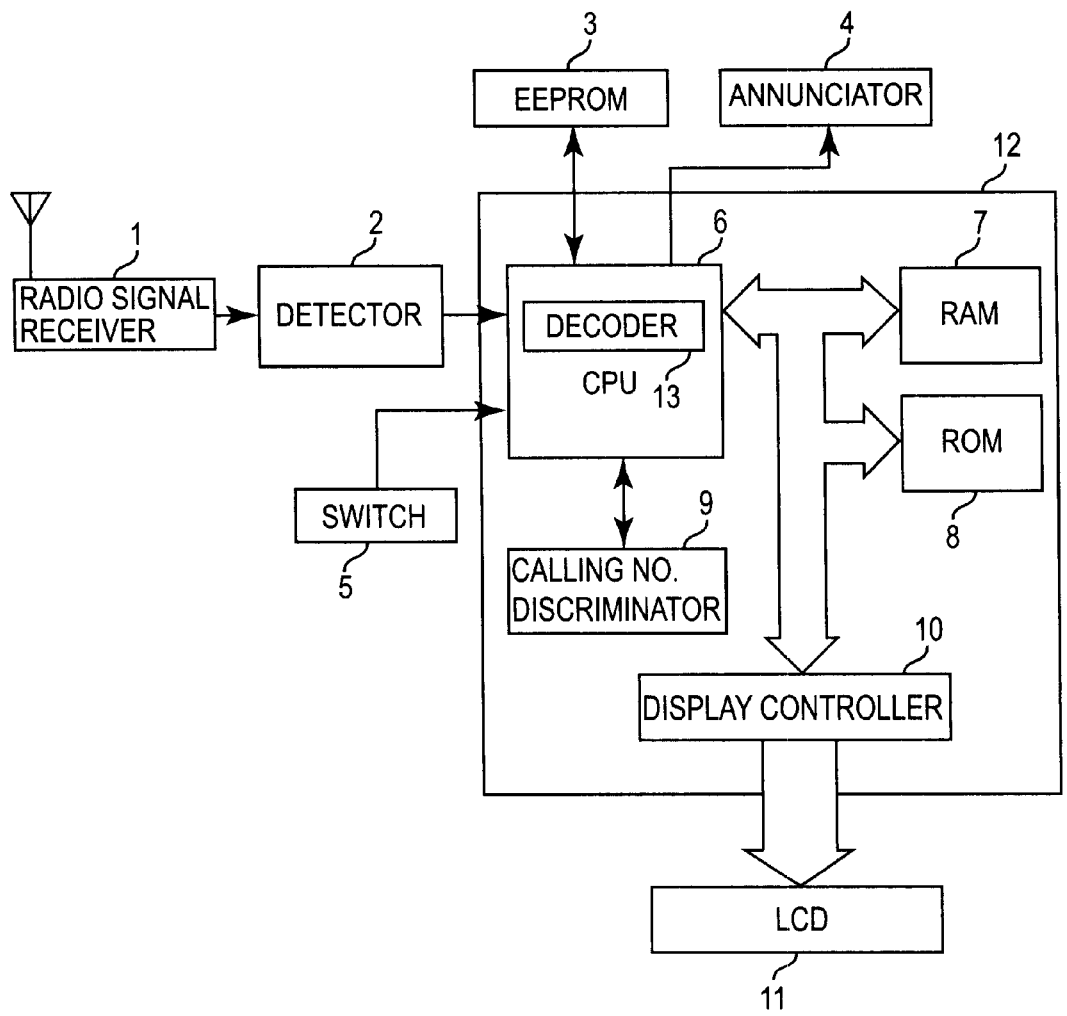
FIG. 1 is a block diagram of a selective calling receiver in accordance with a preferred embodiment of the present invention.

FIG. 1 is a block diagram of a selective calling receiver in accordance with a preferred embodiment of the present invention.

The selective calling receiver in accordance with the first embodiment is comprised of a radio signal receiver 1, a detector 2 which detects and waveform-shapes a radio signal having been received through the radio signal receiver 1, a first memory 3 comprised of an electrically erasable and programmable read only memory (EEPROM) storing therein at least one calling number of the selective calling receiver, a second memory 7 comprised of a random access memory (RAM) storing received message data therein, a third memory 8 comprised of a read only memory (ROM) storing therein a map defining a relation between letter codes and letters, a decoder 13 decoding a signal transmitted from the detector 2, and discriminating whether a calling number in a received signal is coincident with a calling number of the selective calling receiver, a central processing unit (CPU) 6 which discriminates whether received message data is text data or graphics data, based on a calling number of the selective calling receiver, a display 11 comprised of a liquid crystal display (LCD), a display controller 10 receiving data from the second memory 7 and controlling an operation of the display 11, a calling number discriminator 9 which discriminates whether a calling number included in a received signal is a calling number for graphics message data or a calling number for text message data, an annunciator 4, and a switch 5.

The decoder 13 is equipped in CPU 6.

The decoder 13, CPU 6, the second memory 7, the third memory 8, the calling number discriminator 9, and the display controller 10 may be formed as one chip LSI 12.

An operation of the selective calling receiver is explained hereinbelow with reference to FIG. 1.

A selective calling radio signal having been transmitted from a base station (not illustrated) is received at the selective calling receiver through the radio signal receiver 1, and is detected and waveform-shaped in the detector 2 into a base band or a digital signal. The thus detected and waveform-shaped signal is transmitted to CPU 6.

CPU 6 analyzes the received selective calling signal to thereby judge whether a calling number of its own is included in the received selective calling signal. As mentioned earlier, a calling signal or calling signals of the selective calling receiver is stored in the first memory or EEPROM 3. The calling number(s) is(are) read out of the first memory 3 by CPU 6, and stored into an address area in the second memory or RAM 7, when the selective calling receiver is powered on, or a cell is inserted into the selective calling receiver. If only one calling number is stored in the first memory 3, the calling number is a number for graphics message data. If a plurality of calling numbers is stored in the first memory 3, one of the calling numbers is a number for graphics message data, and the remainders are numbers for text message data.

The third memory or ROM 8 stores therein a map defining correspondence between bit rows and a letter, that is, dot data to be displayed in the display 11. FIG. 3 illustrates an example of a map to be stored in the third memory 8. In this map, a letter is expressed in four bits. If a bit row is input into ROM 8 as a reading-out address signal, a letter associated with the thus input bit row is output from ROM 8.

As illustrated in FIG. 3 the third memory or ROM 8 in the instant embodiment stores therein a map defining correspondence between 16 bit rows and 16 letters. Hence, such 16 letters as illustrated in FIG. 3 are displayed in the display 11 in a text message mode.

If a plurality of calling numbers of the selective calling receiver is stored in the first memory 3, the calling number discriminator 9 judges whether a calling number of the selective calling receiver having been detected by the decoder 13 and CPU 6 is a calling number for graphics message data. In accordance with a result of discrimination carried out by the calling number discriminator 9, received message is stored in the second memory (RAM) 7 as text message data or graphics message data.

Specifically, if the calling number discriminator 9 judges that a calling number having been detected by the decoder 13 and CPU 6 is not a calling number for graphics message data, CPU 6 recognizes message data following the calling number, as text message data, that is, as letter data expressed in a unit of a bit row. Herein, a bit row indicates a letter, and may be expressed as a certain bit width. CPU 6 stores the thus recognized message data in the second memory 7.

The display controller 10 receives data having been stored in the second memory 7. If the received data is text message data, the display controller 10 converts bit rows included in the received text message data, into associated letters in accordance with table look-up process. Specifically, the display controller 10 deals the bit rows as address data to thereby read associated letters out of the map stored in the third memory (ROM) 8.

Then, the display controller 10 displays the thus read-out letters in the display or LCD 11.

If the calling number discriminator 9 judges that a calling number having been detected by the decoder 13 and CPU 6 is a calling number for graphics message data, CPU 6 recognizes each bit in message data following the calling number, as each dot data or picture element data to be displayed in the display 11. Then, CPU 6 stores the message data into the second memory 7.

The display controller 10 receives data having been stored in the second memory 7, and displays the thus received data in accordance with correspondence between bit data and dots in the display or LCD 11.

CPU 6 transmits a signal to the annunciator 4 to operate. On receipt of the signal, the annunciator 4 makes sound through a speaker, makes oscillation through a vibrator, or emits a light through a light-emitting diode (LED) to thereby inform a user that message has been received.

The message data stored in the second memory or RAM 7 is displayed in the display 11 when the switch 5 is turned on.

Figure 2A:
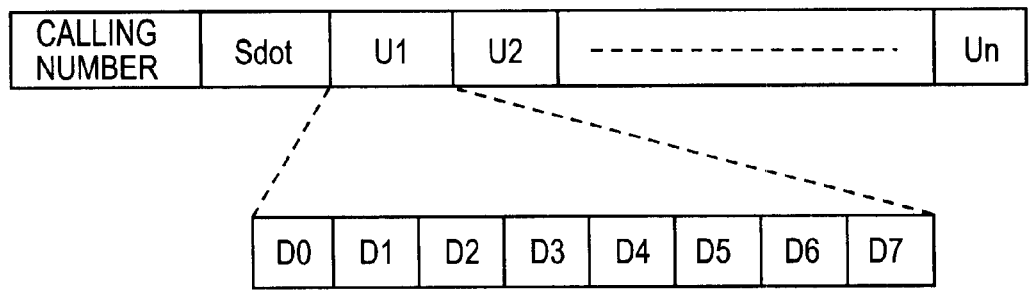
FIG. 2A illustrates an example of a format for graphics message in a preferred embodiment of the present invention.
Figure 2B:
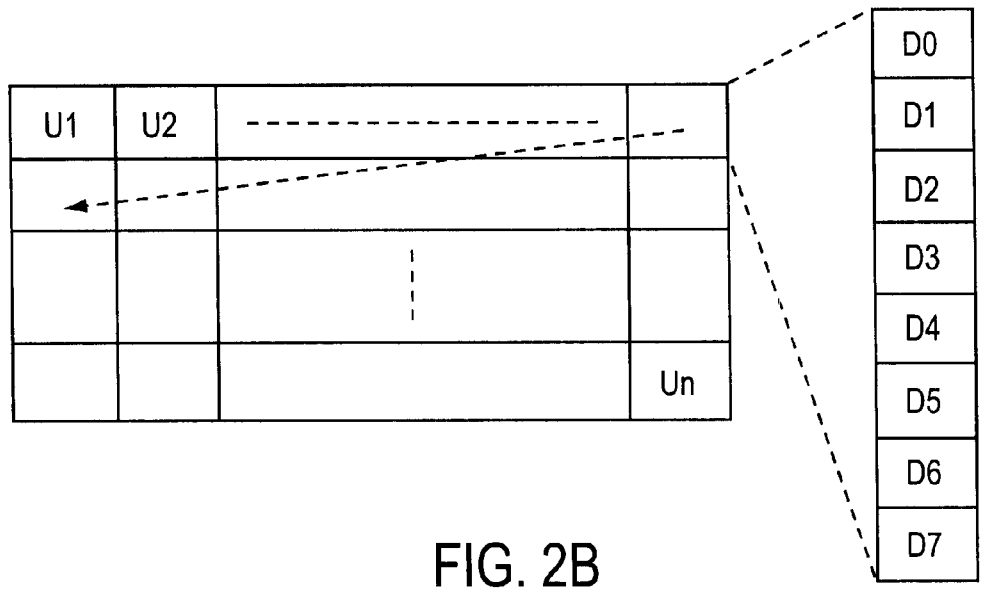
FIG. 2B illustrates an example of graphics display.

FIG. 2A illustrates a signal format for graphics message, and FIG. 2B illustrates how the graphics message is displayed in the display 11.

With reference to FIG. 2A, the signal format is comprised of a calling number, first data indicative of the number Sdot of displayed dots per a row in the display 11, and message data.

The first data is constituted of the certain number of bits. In the instant embodiment, the first data is constituted of 8 bits. However, it should be noted that the number of bits in a unit is not to be limited to 8. Each of message data is partitioned to units U1, U2, - - - , Un each indicative of the number of dots vertically displayed in the display 11. In the instant embodiment, each unit U1, U2, - - - , Un is constituted of 8 bits. When a unit is designed to be constituted of 8 bits in message data, the unit is allocated to vertically 8 dots and horizontally 1 dot in the display 11.

As illustrated in FIG. 2B, first 8 bits in message data, namely, a first unit, constitutes data which defines what is displayed in a first row beginning from a left end of a first column. Similarly, second 8 bits in message data, namely, a second unit, constitutes data which defines what is displayed in a second row beginning from a left end of a first column.

Each of units is successively displayed by vertically 8 dots and horizontally one dot from a left end in a first row. After units have been displayed by the number Sdot indicated in the first data, each of units is successively displayed by vertically 8 dots and horizontally one dot from a left end in a second row. The same is carried out by the number of rows in the display 11. As a result, one image is displayed in the display or LCD 11, as illustrated in FIG. 2B.

The selective calling receiver in accordance with the instant embodiment may further include a detector detecting an error in received message data and/or an error-corrector providing data used for correcting an error found in received message data.

Figure 4:
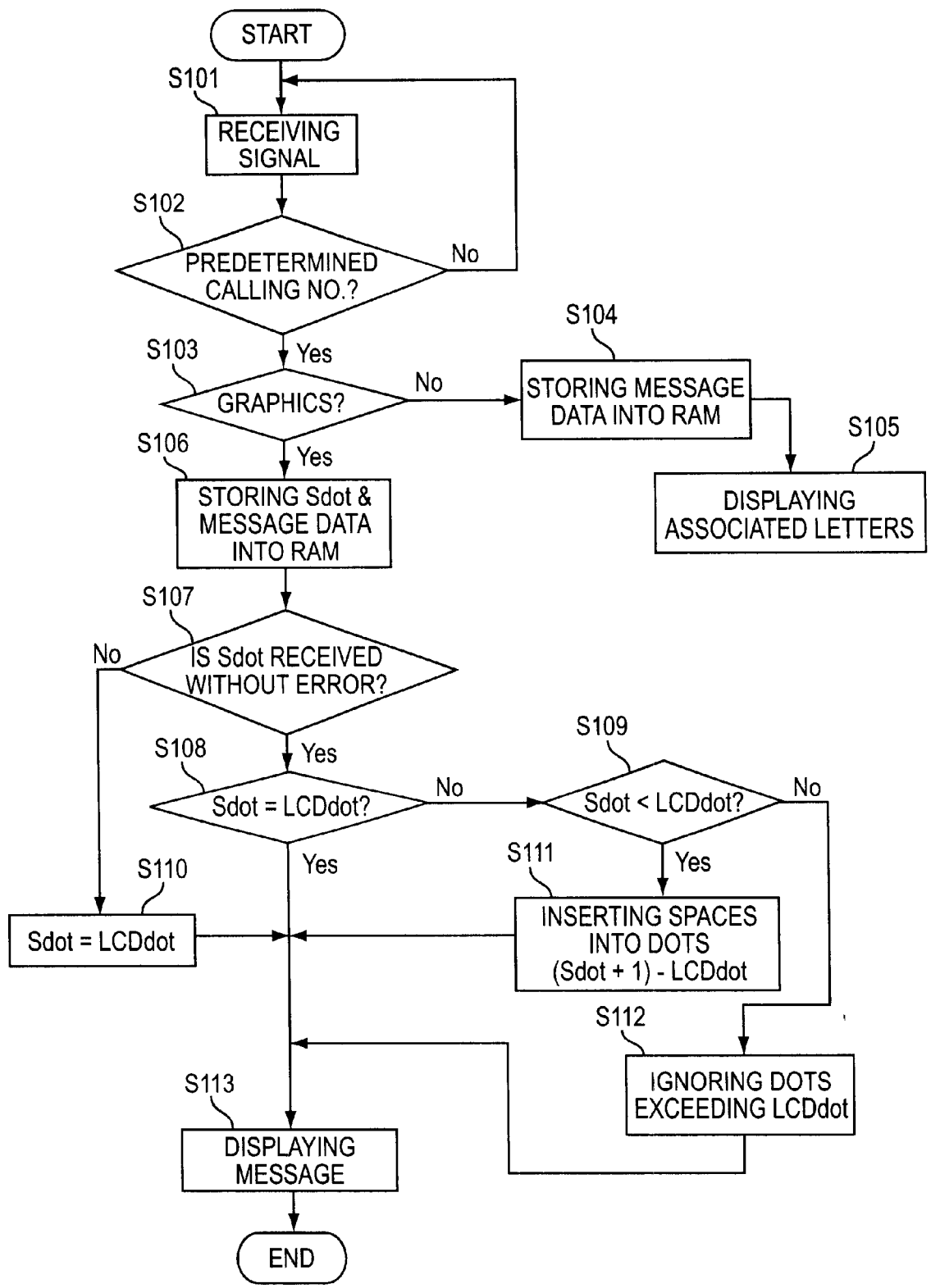
FIG. 4 is a flow chart of a method in accordance with a preferred embodiment of the present invention.

FIG. 4 is a flow chart of a method of displaying message data in the selective calling receiver illustrated in FIG. 1, in accordance with an embodiment of the present invention.

As illustrated in FIG. 4, a selective calling radio-signal is received in step S101.

Then, it is judged as to whether a calling number included in the received signal is coincident with a predetermined calling number, that is, a calling number of a selective calling receiver in use, in step S102.

If it is judged that a calling number included in the received signal is not coincident with the predetermined calling number (NO in step S102), the selective calling receiver awaits receiving a selective calling radio-signal again in step S101.

If a received calling number is coincident with the predetermined calling number (YES in step S102), the calling number discriminator 9 judges whether the received calling number is a calling number for graphics message data, in step S103.

If the calling number discriminator 9 judges that the received calling number is not a calling number for graphics message data (NO in step S103), CPU 6 stores message data following the calling number, into the second memory 7 as text message data, in step S104.

Then, the decoder 13 and CPU 6 partitions the received message data into a plurality of bit rows each including 4 bits, and thereafter, converts each of the bit rows into an associated letter in accordance with the map (see FIG. 3) stored in the third memory or ROM 8. Then, the thus obtained letters are displayed in the display or LCD 11, in step S105.

In the instant embodiment, since one letter is expressed in 4 bits, only 16 letters are displayed in the display 11, as illustrated in FIG. 3. However, it should be noted that if a letter is expressed in the greater number of bits, it would be possible to increase the number of letters to be displayed in the display 11. For instance, if a letter is expressed in 8 bits, it would be possible to display 256 letters in the display 11.

If the calling number discriminator 9 judges that the received calling number is a calling number for graphics message data (YES in step S103), CPU 6 stores both first data indicative of the number Sdot of dots to be displayed in a row, which follows the calling number, and message data following the first data, into the second memory 7 as text message data, in step S106.

Then, it is judged as to whether the first data has been received without an error, in step S107.

If an error is not detected (YES in step S107), it is judged as to whether the number Sdot of dots to be displayed in a row, indicated in the first data, is equal to the maximum number LCDdot of dots to be displayed in a row, in step S108.

When the number of dots to be displayed in a row is equal to the maximum number LCDdot of dots to be displayed in a row (YES in step S108), bit rows in the received message data is displayed in the display 11 within the maximum number LCDdot of dots, in step S113.

Figure 5A:
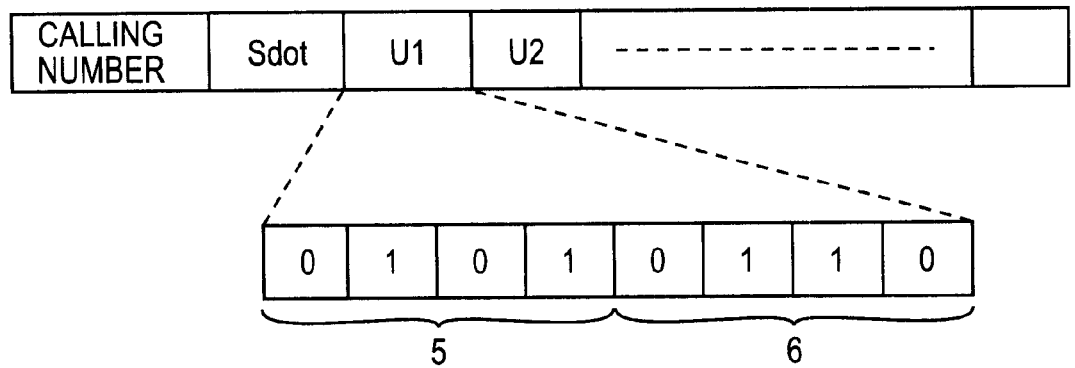
FIG. 5A illustrates an example of a format for graphics message in a preferred embodiment of the present invention.
Figure 5B:
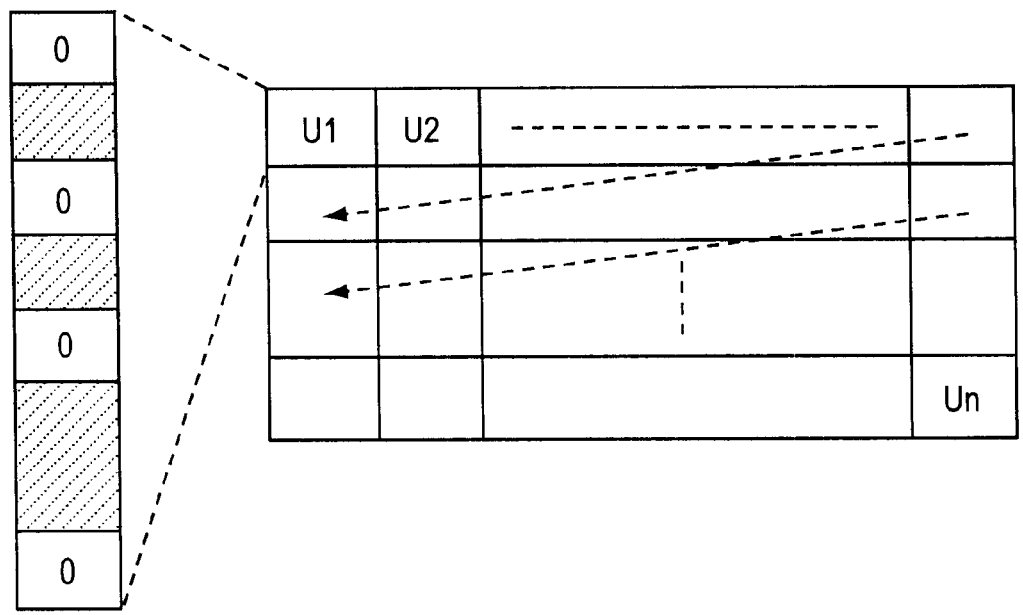
FIG. 5B illustrates an example of graphics display.

FIG. 5A illustrates an example of message format for graphics data, and FIG. 5B illustrates how graphic data is displayed in a display.

Hereinbelow is explained how graphics data is displayed in the display or LCD 11.

When the selective calling receiver receives such format message as illustrated in FIG. 5A, CPU 6 recognizes first bits corresponding to two letters, that is, 8 bits following a calling number, as first data indicative of the number Sdot of dots to be displayed in a row in the display 11, and further recognizes a 8-bit row "01010110" following the first data, as a unit indicative of graphics data.

As is obvious in the map illustrated in FIG. 3, a bit row defined as "0101" indicates a letter "5", and a bit row defined as "0110" indicates a letter "6". Hence, the 8-bit row "01010110" indicates text data of 5 and 6.

If the 8-bit row "01010110" is recognized as graphics data, as illustrated in FIG. 5B, the 8-bit row constituting a unit is allocated to a pixel defined as vertical 8 dots× horizontal 1 dot and located at a first or uppermost row and at a first or leftmost column. A dot associated with data equal to 1 is rendered active in the display 11.

As mentioned above, units each expressed in 8 bits are successively displayed in a pixel defined as vertical 8 dots×horizontal 1 dot in the first row from a leftmost pixel to a rightmost pixel. After units have been displayed in the first row by the number Sdot indicated in the first data, a unit is displayed in a pixel defined as vertical 8 dots×horizontal 1 dot and located at a second row located immediately below the first row, and at the first column. Then, units are displayed in the second row by the number Sdot indicated in the first data.

The same as mentioned above is carried out for all rows in the display 11. Thus, one image is displayed in the display 11.

Referring back to FIG. 4, if the number Sdot of dots per a row, indicated in the first data, is not equal to the maximum number LCDdot of dots per a row, in step 108, it is judged as to whether the number Sdot of dots per a row, indicated in the first data, is smaller than the maximum number LCDdot of dots per a row, in step S109.

If it is judged in step S109 that the number of dots per a row is smaller than the maximum number LCDdot of dots per a row (YES in step S109), spaces are inserted into dots from (Sdot+1) to LCDdot in which no data is included, in step S111. Thereafter, the message is displayed in the display 11, in step S113.

If it is judged in step S109 that the number Sdot of dots per a row is greater than the maximum number LCDdot of dots per a row (NO in step S109), message data associated with surplus dots exceeding the maximum number LCDdot of dots per a row is abandoned in step S112. That is, message data associated with dots is displayed within the maximum number LCDdot of dots per a row, in step S113.

If an error is detected in step S107 (NO in step S107), CPU 6 recognizes in step S110 that the maximum number LCDdot of dots per a row have been received. Then, the received message data is displayed in the display in step S113.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-145435 filed on May 27, 1998 including specification, claims, drawings and summary is incorporated herein by reference in its entirety.

What is claimed is:

1. A selective calling receiver comprising:
    (a) a display;
    (b) a memory storing a plurality of calling numbers of said selective calling receiver, each of said calling numbers being assigned to text data or graphics data;
    (c) a discriminator which receives message data and selective calling number data, and accessing said memory to discriminate whether said message data is text data consisting of letters or graphics data consisting of images, based on said selective calling number data; and
    (d) a controller which displays said message data in said display, as letter data or image data in dependence on a discrimination result provided by said discriminator, and which displays said message data as dot data row in said display when said message data is graphics data, or displays said message data as letter data in said display when said message data is text data.

2. The selective calling receiver as set forth in claim 1, wherein said message data is graphics data transmitted from a base station as text data.

3. A selective calling receiver comprising:
    (a) a display;
    (b) a memory storing a plurality of calling numbers of said selective calling receiver, each of said calling numbers being assigned to text data or graphics data;
    (c) a comparator comparing a selective calling number contained in a received signal to said calling number of said selective calling receiver; and
    (d) a controller which discriminates whether received message data is text data or graphics data, based on said calling number of said selective calling receiver coincident with said selective calling number, and which displays said message data as dot data row in said display when said message data is graphics data, or displays said message data as letter data in said display when said message data is text data.

4. The selective calling receiver as set forth in claim 3, wherein said message data is graphics data transmitted from a base station as text data.

5. A selective calling receiver comprising:
    (a) a display;
    (b) a radio signal receiver;
    (c) means for detecting and waveform-shaping a radio signal having been received through said radio signal receiver;
    (d) a first memory storing therein at least one calling number of said selective calling receiver;
    (e) a second memory storing received message data therein;
    (f) a third memory storing therein a map defining a relation between bit rows and letter data;
    (g) a decoder decoding a signal transmitted from said means, and discriminating whether a calling number in a received signal is coincident with said calling number of said selective calling receiver; and
    (h) a discriminator discriminating whether said received message data is text data or graphics data, based on said calling number of said selective calling receiver,
    said discriminator storing said message data in said third memory as a letter code including at least one unit comprised of the predetermined number of bits, reading out letter data corresponding to said message data, out of said second memory, and displaying the thus read-out letter data in said display, when said message data is text data,
    said discriminator storing said message data in said third memory as dot data in a unit indicative of the number of dots per a row, and displaying said message data in said unit in said display, when said message data is graphics data.

6. The selective calling receiver as set forth in claim 5 wherein said message data includes first data indicative of the number of dots per a row in said display, and wherein
    when said message data is graphics data, said discriminator compares said number of dots indicated in said first data to the maximum number of dots per a row in said display, and
    displays said message data in said unit in said display, if said number of dots is equal to said maximum number of dots,
    inserts space bits into surplus dots per a row when said message data is displayed in said display, if said number of dots is smaller than said maximum number of dots, or
    abandons data about bits exceeding said maximum number of dots, and then, display said message data in said display, if said number of dots is greater than said maximum number of dots.

7. The selective calling receiver as set forth in claim 5 wherein said first memory stores a plurality of calling numbers of said selective calling receiver, each of said calling numbers being assigned to text data or graphics data.

8. The selective calling receiver as set forth in claim 5 wherein said message data is graphics data transmitted from a base station as text data.

9. A method of displaying a received message data, comprising the steps of:
    (a) storing a plurality of calling numbers of a selective calling receiver, each of said calling numbers being assigned to a text message or a graphics message;

(b) discriminating whether a calling number included in a received signal is a predetermined calling number;

(c) discriminating whether said calling number is a number for graphics message or a number for text message;

(d) storing first data and message data following said first data in a memory, if said calling number is a number for graphics message, said first data indicating the number of dots per a row;

(e) discriminating whether said number of dots indicated in said first data is equal to the maximum number of dots per a row; and (f) displaying a bit row in said message data within a range of said maximum number of dots, if said number of dots indicated in said first data is equal to the maximum number of dots per a row.

10. The method as set forth in claim 9, further comprising the step of (g) discriminating whether said first data has been received without an error, and wherein said step (e) is carried out, if said first data has been received without an error.

11. The method as set forth in claim 9, further comprising the step of (h) displaying received message data in a display, if said first data has been received with an error.

12. The method as set forth in claim 9, further comprising the step of (i) discriminating whether said number of dots per a row is smaller than said maximum number of dots per a row, if said number of dots per a row is not equal to said maximum number of dots per a row, and inserting spaces into dots having no data therein, if said number of dots per a row is smaller than said maximum number of dots per a row.

13. The method as set forth in claim 9, further comprising the step of (j), if said number of dots per a row is greater than said maximum number of dots per a row, abandoning message data included in surplus dots exceeding said maximum number of dots.

\* \* \* \* \*